US010891252B2

(12) United States Patent
Zhong

(10) Patent No.: US 10,891,252 B2
(45) Date of Patent: Jan. 12, 2021

(54) METHOD AND APPARATUS FOR PUSHING ELECTRONIC BOOK

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Ying Zhong, Beijing (CN)

(73) Assignees: Beijing Jingdong Shangke Information Technology Co., Ltd., Beijing (CN); Beijing Jingdong Century Trading Co., Ltd., Beijing (CN)

(*) Notice: Subject to any disclaimer, the term of this patent is extended or adjusted under 35 U.S.C. 154(b) by 45 days.

(21) Appl. No.: 16/068,242

(22) PCT Filed: Dec. 30, 2016

(86) PCT No.: PCT/CN2016/113507
§ 371 (c)(1),
(2) Date: Jul. 5, 2018

(87) PCT Pub. No.: WO2017/118345
PCT Pub. Date: Jul. 13, 2017

(65) Prior Publication Data
US 2019/0018819 A1      Jan. 17, 2019

(30) Foreign Application Priority Data

Jan. 6, 2016   (CN) .......................... 2016 1 0007278

(51) Int. Cl.
*G06F 15/02*      (2006.01)
*G06F 3/147*      (2006.01)
(Continued)

(52) U.S. Cl.
CPC ........ *G06F 15/0291* (2013.01); *G06F 3/0481* (2013.01); *G06F 3/147* (2013.01);
(Continued)

(58) Field of Classification Search
CPC .............. G06F 3/0481; G06F 16/9535; G06Q 30/0631; G06Q 30/0255; G06Q 30/0269; H04N 21/466; H04N 21/4532
See application file for complete search history.

(56) References Cited

U.S. PATENT DOCUMENTS 5,697,793 A * 12/1997 Huffman ............. G06F 15/0283
434/156
8,260,915 B1 * 9/2012 Ashear .................... G06F 13/00
709/224

(Continued)

FOREIGN PATENT DOCUMENTS

CN       103092910       5/2013
CN       104063476       9/2014
(Continued)

OTHER PUBLICATIONS

International Search Report for Application No. PCT/CN2016/113507, dated Mar. 28, 2017 (4 pages).

*Primary Examiner* — Eric J. Bycer
(74) *Attorney, Agent, or Firm* — Nixon Peabody LLP

(57) ABSTRACT

A method and device for pushing an electronic book. the method comprises: obtaining reading duration information sent by multiple terminals (210), the reading duration information comprising identity information of the terminals, identifier information of electronic books read by users of the terminals, and reading time information corresponding to the identifier information; determining, according to the reading time information, reading preference information of the terminals corresponding to the identity information and average reading durations of the electronic books corre- (Continued)

sponding to the identifier information (220); and pushing a first electronic book to a first terminal according to the reading preference information and the average reading durations (230), the average reading duration of the first electronic book matching the reading preference information of the first terminal. By means of the method and the device, targeted pushing of electronic books is implemented.

15 Claims, 6 Drawing Sheets

(51) Int. Cl.

| | | |
|---|---|---|
| *G06F 16/00* | (2019.01) | |
| *H04N 21/45* | (2011.01) | |
| *G09G 3/18* | (2006.01) | |
| *G09G 5/10* | (2006.01) | |
| *G09G 5/00* | (2006.01) | |
| *G06F 16/9535* | (2019.01) | |
| *G06Q 30/02* | (2012.01) | |
| *G06Q 30/06* | (2012.01) | |
| *H04N 21/466* | (2011.01) | |
| *G06F 3/0481* | (2013.01) | |

(52) U.S. Cl.
CPC ............. *G06F 16/00* (2019.01); *G09G 3/18* (2013.01); *G09G 5/10* (2013.01); *H04N 21/4532* (2013.01); *G06F 16/9535* (2019.01); *G06Q 30/0255* (2013.01); *G06Q 30/0269* (2013.01); *G06Q 30/0631* (2013.01); *G09G 5/005* (2013.01); *G09G 2380/14* (2013.01); *H04N 21/466* (2013.01)

(56) References Cited

U.S. PATENT DOCUMENTS

| | | | | |
|---|---|---|---|---|
| 8,954,835 | B1* | 2/2015 | Cabanero | G06F 16/94 |
| | | | | 715/206 |
| 9,223,830 | B1 | 12/2015 | Dzik | |
| 9,715,482 | B1* | 7/2017 | Bjorkegren | G06F 40/103 |
| 2007/0078552 | A1* | 4/2007 | Rosenberg | G06F 1/1626 |
| | | | | 700/94 |
| 2011/0191701 | A1* | 8/2011 | Kim | G06F 9/451 |
| | | | | 715/763 |
| 2011/0320276 | A1* | 12/2011 | Ray | G06Q 30/02 |
| | | | | 705/14.53 |
| 2012/0001923 | A1* | 1/2012 | Weinzimmer | G06F 3/167 |
| | | | | 345/473 |
| 2012/0036431 | A1 | 2/2012 | Ito et al. | |
| 2013/0041774 | A1 | 2/2013 | Emura | |
| 2013/0080471 | A1* | 3/2013 | Forte | G06F 21/6218 |
| | | | | 707/785 |
| 2013/0117702 | A1 | 5/2013 | Jang | |
| 2013/0151954 | A1* | 6/2013 | Ierullo | G06F 3/04842 |
| | | | | 715/254 |
| 2013/0293467 | A1 | 11/2013 | Norden | |
| 2014/0114990 | A1* | 4/2014 | Burba | H04L 67/22 |
| | | | | 707/752 |
| 2014/0123311 | A1* | 5/2014 | Pegg | G06F 21/10 |
| | | | | 726/27 |
| 2014/0125581 | A1* | 5/2014 | Chitkara | G06F 3/013 |
| | | | | 345/156 |
| 2014/0188766 | A1* | 7/2014 | Waldman | G06Q 30/0255 |
| | | | | 705/400 |
| 2014/0289241 | A1* | 9/2014 | Anderson | G06F 16/48 |
| | | | | 707/736 |
| 2014/0325407 | A1* | 10/2014 | Morris | G06F 3/0481 |
| | | | | 715/765 |
| 2014/0340531 | A1* | 11/2014 | Jain | G06K 9/00308 |
| | | | | 348/207.1 |
| 2015/0006258 | A1 | 1/2015 | Rotaru | |
| 2015/0120816 | A1* | 4/2015 | Bertelsen | H04L 67/02 |
| | | | | 709/203 |
| 2016/0063318 | A1* | 3/2016 | Cheatham, III | G06K 9/00335 |
| | | | | 348/143 |
| 2016/0179192 | A1* | 6/2016 | Wu | G06F 3/0483 |
| | | | | 345/156 |
| 2016/0210269 | A1* | 7/2016 | Parker | G06F 15/0291 |

FOREIGN PATENT DOCUMENTS

| | | |
|---|---|---|
| CN | 104598505 A | 5/2015 |
| CN | 104980480 | 10/2015 |
| CN | 105677845 | 6/2016 |
| EP | 2555148 A1 | 2/2013 |
| RU | 2542944 C2 | 2/2015 |
| WO | 2013165646 A2 | 11/2013 |

* cited by examiner

METHOD AND APPARATUS FOR PUSHING ELECTRONIC BOOK

CROSS-REFERENCE TO RELATED APPLICATIONS

This application is a national stage of International Application No. PCT/CN2016/113507, filed on Dec. 30, 2016, which claims the priority of Chinese Patent Application No. 201610007278.0 filed on Jan. 6, 2016. Both of the aforementioned applications are hereby incorporated by reference in their entireties.

TECHNICAL FIELD

The present disclosure relates to the field of computer technology, specifically relate to the field of Internet technology, and more specifically relate to a method and apparatus for pushing an electronic book.

BACKGROUND

Digital reading refers to the digitization of reading and has two main meanings. The first meaning is the digitization of reading objects, that is, the reading content is presented digitally, such as electronic books, web fictions, electronic maps, digital photos, blogs and web pages; and the second meaning is the digitization of reading ways, that is, the carrier and terminal of reading is not a flat paper, but an electronic device with a screen display, such as a personal computer, a notebook computer, a mobile phone and a reader. Compared with conventional paper publications, digital electronic publications have the advantages of large storage capacity, convenient retrieval, easy storage, and low cost. Therefore, digital reading is increasingly welcomed and sought after by young people in many countries.

Information push, also known as "webcasting," is a technology that reduces information overload by pushing needed information to users on the Internet through certain technical standards or protocols. Information push technology may reduce time of the users spent on searching on the Internet by actively pushing information to the users.

The existing method for pushing an electronic book usually determines a to-be-pushed electronic book based on the contents of the electronic books that have been read by the user. However, the user reads various contents. In addition, reading habits of the user other than the read contents are not considered in the existing method for pushing an electronic book, leading to problems such as a big difference between the electronic book pushed to the user and the electronic book the user actually expects to read, and lack of pertinence of the pushed electronic books.

SUMMARY

The objective of the present disclosure is to propose an improved method and apparatus for pushing an electronic book, to solve the technical problems mentioned in the foregoing Background section.

In a first aspect, the present disclosure provides a method for pushing an electronic book, including: acquiring reading duration information sent by a plurality of terminals, the reading duration information including identity information of the terminals, identification information of an electronic book read by a user of the terminals and reading time information corresponding to the identification information; determining reading preference information of each terminal corresponding to the identity information and an average reading duration of each electronic book corresponding to the identification information based on the reading time information; and pushing a first electronic book to a first terminal based on the reading preference information and the average reading duration, an average reading duration of the first electronic book matching reading preference information of the first terminal.

In some embodiments, the reading time information includes a reading progress and an accumulated duration corresponding to the reading progress, the reading progress including a ratio of a number of read words in the electronic book to a total number of words in the electronic book. The determining reading preference information of the terminals corresponding to the identity information based on the reading time information includes: determining a reading completion duration of each electronic book corresponding to the identification information, based on the reading progress and the accumulated duration corresponding to the reading progress; and determining the reading preference information of each terminal. The reading preference information includes an average reading completion duration determined based on the a reading completion duration of the each terminal regarding each electronic book corresponding to the identification information of the terminals. The pushing a first electronic book to a first terminal based on the reading preference information and the average reading duration includes: pushing the first electronic book to the first terminal, based on a difference between the average reading duration of the first electronic book and an average reading completion duration in the reading preference information of the first terminal being less than a predetermined time threshold.

In some embodiments, the determining an average reading duration of each electronic book corresponding to the identification information based on the reading time information includes: determining a number of occurrence of a reading completion duration of each terminal regarding same identification information; and determining the average reading duration of each electronic book based on the reading completion duration of the each terminal regarding same identification information and the number of occurrence of the reading completion duration.

In some embodiments, the determining the average reading duration of each electronic book based on the reading completion duration of the each terminal regarding same identification information and the number of occurrence of the reading completion duration includes determining the average reading duration according to the following formula:

$$T = \frac{\sum_{i=1}^{n} T_i X_i}{\sum_{i=1}^{n} X_i};$$

T is the average reading duration, $X_i$ is the number of occurrences of the $i^{th}$ reading completion duration $T_i$, and satisfies:

$$\sum_{i=1}^{n} T_i X_i = \sum_{j=1}^{m} T_j;$$

and m is a number of terminals reading the electronic book corresponding to the identification information, and $T_j$ is reading completion duration of a $j^{th}$ terminal.

In a second aspect, the present disclosure further provides a method for pushing an electronic book, including: acquiring reading state information at a predetermined time interval, in response to a predetermined operation of a user, the predetermined operation being an operation for instructing the user to start reading a first electronic book; determining an accumulated duration of the user reading the first electronic book based on the state information; acquiring a reading progress corresponding to the accumulated duration; sending reading duration information to a server, the reading duration information including the accumulated duration, the reading progress corresponding to the accumulated duration, and identification information of the first electronic book; and receiving a to-be-recommended electronic book determined based on the reading duration information and sent by the server.

In some embodiments, the determining an accumulated duration of the user reading the first electronic book based on the state information includes: adding a duration of the predetermined time interval to the accumulated duration, if each of two successively acquired pieces of the state information satisfies a predetermined accumulated time condition.

In some embodiments, the reading state information includes a screen luminance and an eye state of the user. The predetermined accumulated time condition includes at least one of: the screen luminance exceeding a predetermined luminance; and a vision point being in a predetermined screen area.

In a third aspect, the present disclosure further provides an apparatus for pushing an electronic book, including: an acquisition module, configured to acquire reading duration information sent by a plurality of terminals, the reading duration information including identity information of the terminals, identification information of an electronic book read by a user of the terminals and reading time information corresponding to the identification information; a determination module, configured to determine reading preference information of each terminal corresponding to the identity information and an average reading duration of each electronic book corresponding to the identification information based on the reading time information; and a pushing module, configured to push a first electronic book to a first terminal based on the reading preference information and the average reading duration, an average reading duration of the first electronic book matching reading preference information of the first terminal.

In some embodiments, the reading time information includes a reading progress and an accumulated duration corresponding to the reading progress, the reading progress including a ratio of a number of read words in the electronic book to a total number of words in the electronic book. When determining reading preference information of each terminal corresponding to the identity information based on the reading time information, the determination module is further configured to: determine a reading completion duration of each electronic book corresponding to the identification information, based on the reading progress and the accumulated duration corresponding to the reading progress; and determine the reading preference information of the terminals. The reading preference information comprises an average reading completion duration determined based on a reading completion duration of the each terminal regarding each electronic book corresponding to the identification information. The pushing module is further configured to: push the first electronic book to the first terminal, based on a difference between the average reading duration of the first electronic book and an average reading completion duration in the reading preference information of the first terminal being less than a predetermined time threshold.

In some embodiments, when determining an average reading duration of each electronic book corresponding to the identification information based on the reading time information, the determination module is further configured to: determine a number of occurrence of a reading completion duration of each terminal regarding same identification information; and determine the average reading duration of each electronic book based on the reading completion duration of the each terminal regarding same identification information and the number of occurrence of the reading completion duration.

In some embodiments, when determining the average reading duration of each electronic book based on the reading completion duration of the each terminal regarding same identification information and the number of occurrence of the reading completion duration, the determination module determines the average reading duration according to the following formula:

$$T = \frac{\sum_{i=1}^{n} T_i X_i}{\sum_{i=1}^{n} X_i};$$

T is the average reading duration, $X_i$ is the number of occurrence of the an $i^{th}$ reading completion duration $T_i$, and satisfies:

$$\sum_{i=1}^{n} T_i X_i = \sum_{j=1}^{m} T_j;$$

and m is a number of terminals reading the electronic book corresponding to the identification, and $T_j$ is a reading completion duration of a $j^{th}$ terminal.

In a fourth aspect, the present disclosure further provides an apparatus for pushing an electronic book, including: a first acquisition module, configured to acquire reading state information at a predetermined time interval, in response to a predetermined operation of a user, the predetermined operation being an operation for instructing the user to start reading a first electronic book; a determination module, configured to determine an accumulated duration of the user reading the first electronic book based on the state information; a second acquisition module, configured to acquire a reading progress corresponding to the accumulated duration; a sending module, configured to send reading duration information to a server, the reading duration information including the accumulated duration, the reading progress corresponding to the accumulated duration, and identification information of the first electronic book; and a receiving module, configured to receive a to-be-recommended electronic book determined based on the reading duration information and sent by the server.

In some embodiments, the determination module is further configured to: add a duration of the predetermined time interval to the accumulated duration, if each of two successively acquired pieces of the state information satisfies a predetermined accumulated time condition.

In some embodiments, the reading state information includes a screen luminance and an eye state of the user. The predetermined accumulated time condition includes at least one of: the screen luminance exceeding a predetermined luminance; and a vision point being in a predetermined screen area.

The method and apparatus for pushing an electronic book according to the present disclosure determine the reading preferences of the users by accurately collecting and acquiring the reading durations of the users, and then push electronic books meeting the reading preferences to the users, realizing a targeted push of electronic books.

In some embodiments of the present disclosure, the reading state of the user is determined by the screen luminance of the terminal and/or the position of the vision point, so that whether the user is in a reading state may be more accurately determined, and more accurate accumulated reading duration may be further acquired.

BRIEF DESCRIPTION OF THE DRAWINGS

After reading detailed descriptions of non-limiting embodiments given with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
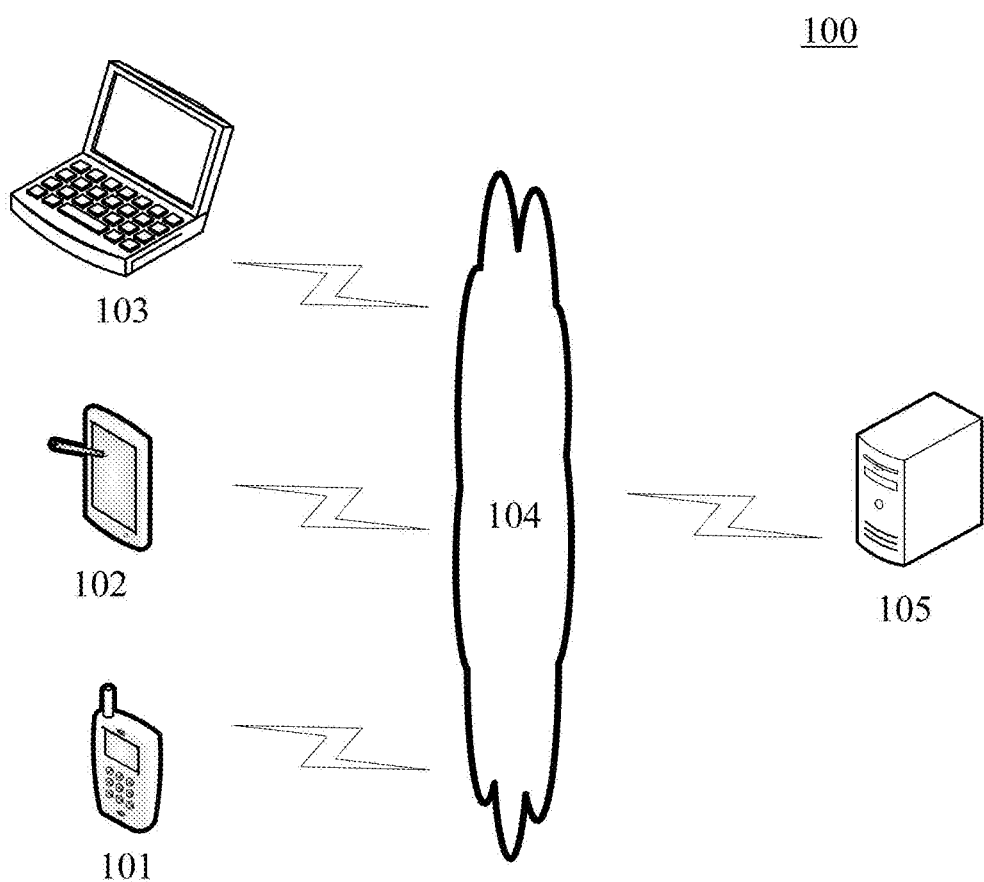
FIG. 1 is an exemplary system architecture diagram to which the present disclosure may be applied.

FIG. 1 shows an examplary system architecture 100 to which a method for pushing an electronic book or an apparatus for generating a web page according to an embodiment of present disclosure may be applied.

As shown in FIG. 1, the system architecture 100 may include terminal devices 101, 102, 103, a network 104 and a server 105. The network 104 serves as a medium providing a communication link between the terminal devices 101, 102, 103 and the server 105. The network 104 may include various types of connections, such as wired or wireless communication links, or optical fibers.

A user may use the terminal devices 101, 102, 103 to interact with the server 105 through the network 104, in order to transmit or receive messages, etc. The terminal devices 101, 102, 103 may be installed with various communication client applications such as an electronic book reading application, a shopping application, a search application, an instant messaging tool, an email client, and a social network software.

The terminal devices 101, 102, 103 may be various electronic devices having display screens and being capable of communicating with the server, including but not limited to smart phones, tablet computers, e-book readers, MP3 (Moving Picture Experts Group Audio Layer III) players, MP4 (Moving Picture Experts Group Audio Layer IV) players, laptop portable computers, and desktop computers.

The server 105 may be a server that provides various services, such as an electronic book server that transmits a corresponding electronic book to the terminal devices 101, 102, 103 based on an electronic book reading request of the terminal devices 101, 102, 103. The electronic book server may also perform processing such as analysis on data such as received reading duration information, and feed back (e.g., push) a processing result (e.g., an electronic book associated with the reading duration information) to the terminal devices 101, 102, 103.

It should be noted that the method for pushing an electronic book provided by the embodiments of the present disclosure may be executed by the server 105, or may be executed by the terminal devices 101, 102, 103. Accordingly, the apparatus for pushing an electronic book may be arranged in the server 105, or may be arranged in the terminal devices 101, 102, 103.

It should be understood that the numbers of the terminal devices, the networks and the servers in FIG. 1 are merely illustrative. Any number of terminal devices, networks and servers may be provided based on the implementation requirements.

Figure 2:
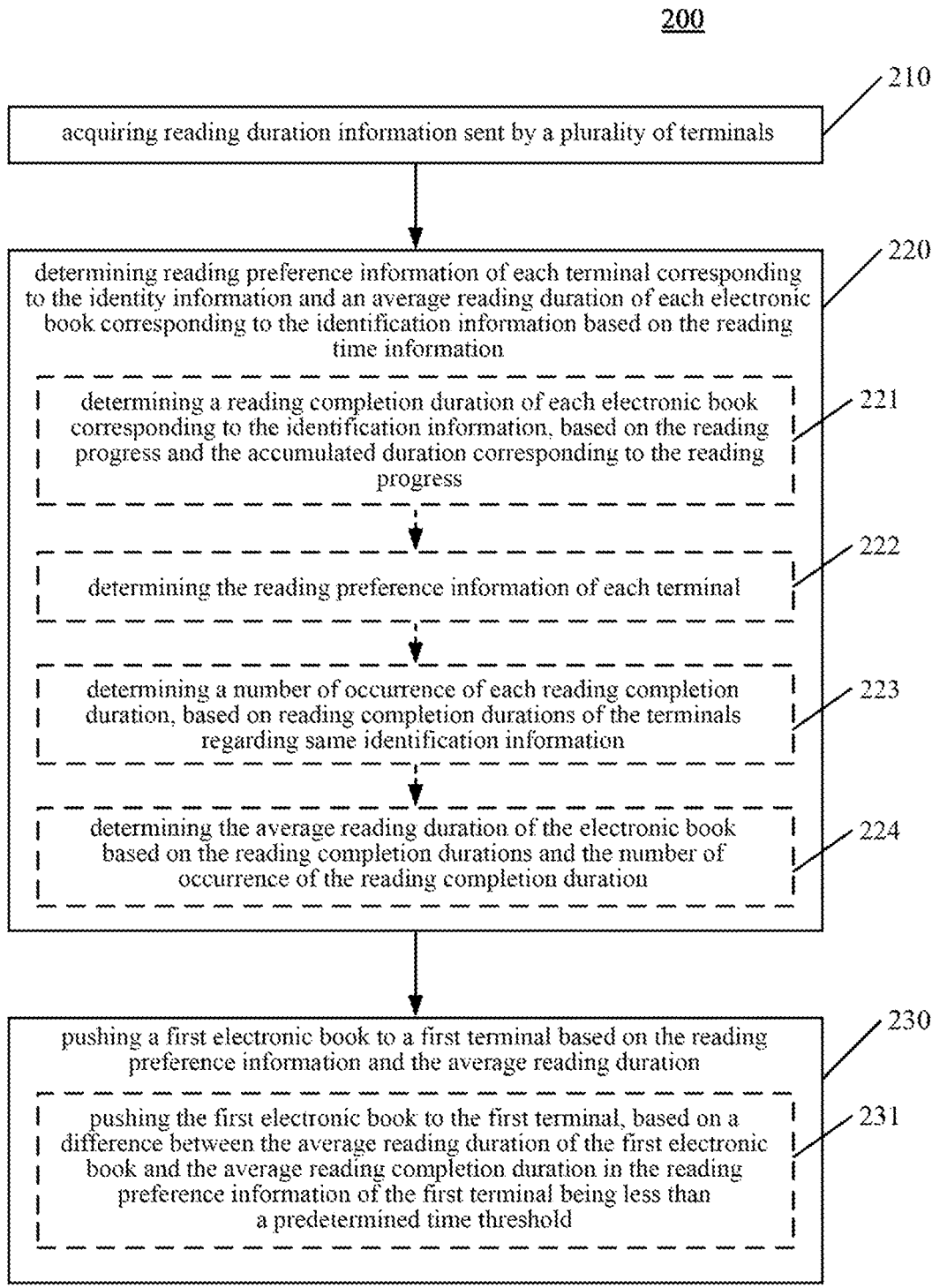
FIG. 2 is a schematic flowchart of an embodiment of a method for pushing an electronic book according to the present disclosure.

With further reference to FIG. 2, a flow 200 of an embodiment of the method for pushing an electronic book according to the present disclosure is illustrated. The method for pushing an electronic book includes the steps 210 to 230.

Step 210 includes acquiring reading duration information sent by a plurality of terminals, the reading duration information including identity information of the terminals, identification information of an electronic book read by a user of the terminals and reading time information corresponding to the identification information.

In the present embodiment, the electronic device (e.g., the server as shown in FIG. 1) on which the method for pushing an electronic book is implemented may acquire, through a wired connection or a wireless connection, the reading duration information from a terminal used by the user for reading the electronic book. It should be noted that the wireless connection may include, but is not limited to, 3G/4G connection, WiFi connection, BLUETOOTH (telecommunication, and communication services) connection, WiMAX connection, ZIGBEE (telecommunication, and communication services) connection, UWB (ultra wideband) connection, and other wireless connections known by now or to be developed in the future.

Here, the reading duration information may include a quantitative expression of the length of time for reading the electronic book by the user using the terminal.

The identity information of the terminal may be information that can uniquely represent the identity of the terminal. For example, when the terminal is a smart phone having a display screen, the identity information of the terminal may be, for example, the phone number of the smart phone. Alternatively, in some application scenarios, when the terminal is used for reading the electronic book through a reading application installed thereon, the identity information of the terminal may be, for example, the user name of the user of the terminal logging into the reading application, and the user name has a one-to-one corresponding relation with the user of the terminal in the reading application.

Similarly, the identification information of the electronic book may also have a one-to-one corresponding relation with the electronic book. In some application scenarios, for example, the title of the electronic book may be used as the identification information of the electronic book. Alternatively, in some other application scenarios, in order to distinguish a plurality of electronic books having the same title, information (for example, publisher name, publication date, etc.) other than the title may be used together with the title as the identification information of the electronic book.

In some application scenarios, the user of the terminal may alternately read a plurality of electronic books within a period of time (for example, within one week or one month,) and electronic books read by users of different terminals are also different. By acquiring the reading duration information sent by the terminals, the electronic device on which the method for pushing an electronic book is implemented according to the present embodiment may accurately locate the user of each terminal, each electronic book and the reading time information of each electronic book read by the user of each terminal using the terminal.

Step 220 includes determining reading preference information of each terminal corresponding to the identity information and an average reading duration of each electronic book corresponding to the identification information based on the reading time information.

Due to the individual differences, the users of the terminals have different habits and preferences of reading the electronic book. For example, some users prefer "fast reading," which is characterized in that the reading speed is fast and large amounts of content can be read in a relatively short period of time. Others prefer "intensive reading" which is characterized in that the reading speed is slow and content read per unit of time is little.

In addition, similarly, due to the difference between lengths, subject types, and the like of different electronic books, a reader may read these electronic books in different reading speeds. That is to say, even for a same reader, the reading speed is different in reading electronic books of different subject types. Here, the reading speed may be, for example, a quantitative expression used to characterize the amount of reading (e.g., number of words or pages) per unit of time.

Step 230 includes pushing a first electronic book to a first terminal based on the reading preference information and the average reading duration, an average reading duration of the first electronic book matching reading preference information of the first terminal.

As described above, the reading habits of the users of the terminals are not the same. Due to different lengths and subjects of the electronic books, the reader require different lengths of time to finish reading different electronic books.

By accurately acquiring the reading preference information of the users of the terminals and the average reading durations of the electronic books, and determining an electronic book to be pushed and a terminal to which the electronic book is pushed based on these parameters, the pushed electronic book may match the reading preference of the user of the terminal receiving the pushed electronic book, so that the pushed electronic book is more targeted. Further, the problem of huge amount of network traffic required for the push that may result from a "non-targeted" push of the electronic book may be avoided.

In some alternative implementations, the reading time information may include a reading progress and an accumulated duration corresponding to the reading progress.

In these alternative implementations, the reading progress may be determined, for example, by a ratio of the number of read words in the electronic book to the total number of words in the electronic book. Alternatively, the reading progress may be determined by the ratio of the number of read pages in the electronic book to the total number of pages in the electronic book.

In some alternative implementations, the determining reading preference information of the terminals corresponding to the identity information based on the reading time information in step 220 may further include steps 221 to 224.

Step 221 includes determining a reading completion duration of each electronic book corresponding to the identification information, based on the reading progress and the accumulated duration corresponding to the reading progress.

In some alternative implementations, the reading progress of a certain terminal for an electronic book is p ($0<p\leq1$), and the accumulated duration corresponding to the reading progress p is t ($t>0$). Then, the reading completion duration of the terminal regarding the electronic book may be determined by t/p.

For example, if the reading progress of the certain terminal regarding the electronic book is 20% and the accumulated duration corresponding to the reading progress is 3 hours, then it may be calculated that the reading completion duration of the terminal for the electronic book is 3÷20%=15 hours.

Step 222 includes determining the reading preference information of each terminal. Here, the reading preference information may include, for example, an average reading completion duration determined based on the reading completion duration of the terminal regrading each electronic book corresponding to identification information.

For the user of a certain terminal, the reading habits conform to certain statistical rules. For example, the reading speed, the preferred type of books, the time spent for completing a single electronic book, etc. each are within a relatively small range.

In this step, by determining the average reading completion durations of the users of the terminals, the "preference" of the reading duration of each user to complete an electronic book may be determined, so that the subsequent electronic book pushed to the user can better meet the "preference" of the user regarding the reading completion duration, so that the possibility that the electronic book pushed to the user is accepted by the user increases.

In some alternative implementations, the determining an average reading duration of the electronic book corresponding to the identification information based on the reading time information in step 220 may further include steps 223 and 224.

Step 223 includes determining a number of occurrence of each reading completion duration, based on reading completion durations of the terminals regarding same identification information.

As described above, since the identification information has a one-to-one corresponding relation with the electronic book, the reading completion durations for the same identification information is the reading completion durations for the same electronic book.

Here, the number of occurrence of each reading completion duration refers to the number of repetition of the time value of each of reading completion durations of a plurality of terminals reading the same electronic book.

For example, the reading completion durations for N terminals are respectively T1 to TN. If T1=T2=T3 and T4=T5, then the number of occurrences of the value T1 is 3, and the number of occurrences of the value T4 is 2.

Step 224 includes determining the average reading duration of the electronic book based on the reading completion durations and the number of occurrence of the reading completion duration.

Since the number of occurrence of each reading completion duration is taken into consideration when determining the average reading duration, the time value with more occurrence times may obtain a larger weight accordingly, and the time value with fewer occurrence times may obtain a smaller weight accordingly, so that the average reading duration ultimately determined is more in line with the actual reading duration of most users.

In some alternative implementations, the average reading duration of a certain electronic book may be determined according to the following formula:

$$T = \frac{\sum_{i=1}^{n} T_i X_i}{\sum_{i=1}^{n} X_i}. \quad (1)$$

In formula (1), T is the average reading duration, $X_i$ is the number of occurrence of the $i^{th}$ reading completion duration $T_i$, and satisfies:

$$\sum_{i=1}^{n} T_i X_i = \sum_{j=1}^{m} T_j,$$

that is, $$\sum_{i=1}^{n} X_i = m.$$

m is the number of terminals reading the electronic book corresponding to the identification information, and $T_j$ is a reading completion duration of the $j^{th}$ terminal.

The average reading duration T obtained by the above formula (1) is more in line with the actual reading duration of most users.

In some alternative implementations, the pushing a first electronic book to a first terminal based on the reading preference information and the average reading duration in step 230 may further include step 231.

Step 231 includes pushing the first electronic book to the first terminal, based on a difference between the average reading duration of the first electronic book and the average reading completion duration in the reading preference information of the first terminal being smaller than a predetermined time threshold.

In this way, the matching degree between the reading preference of the user of the terminal receiving the push first electronic book and the pushed first electronic book may be improved, thereby making the push more targeted, that is, increasing the possibility that the terminal accepts the first electronic book being pushed.

Figure 3:
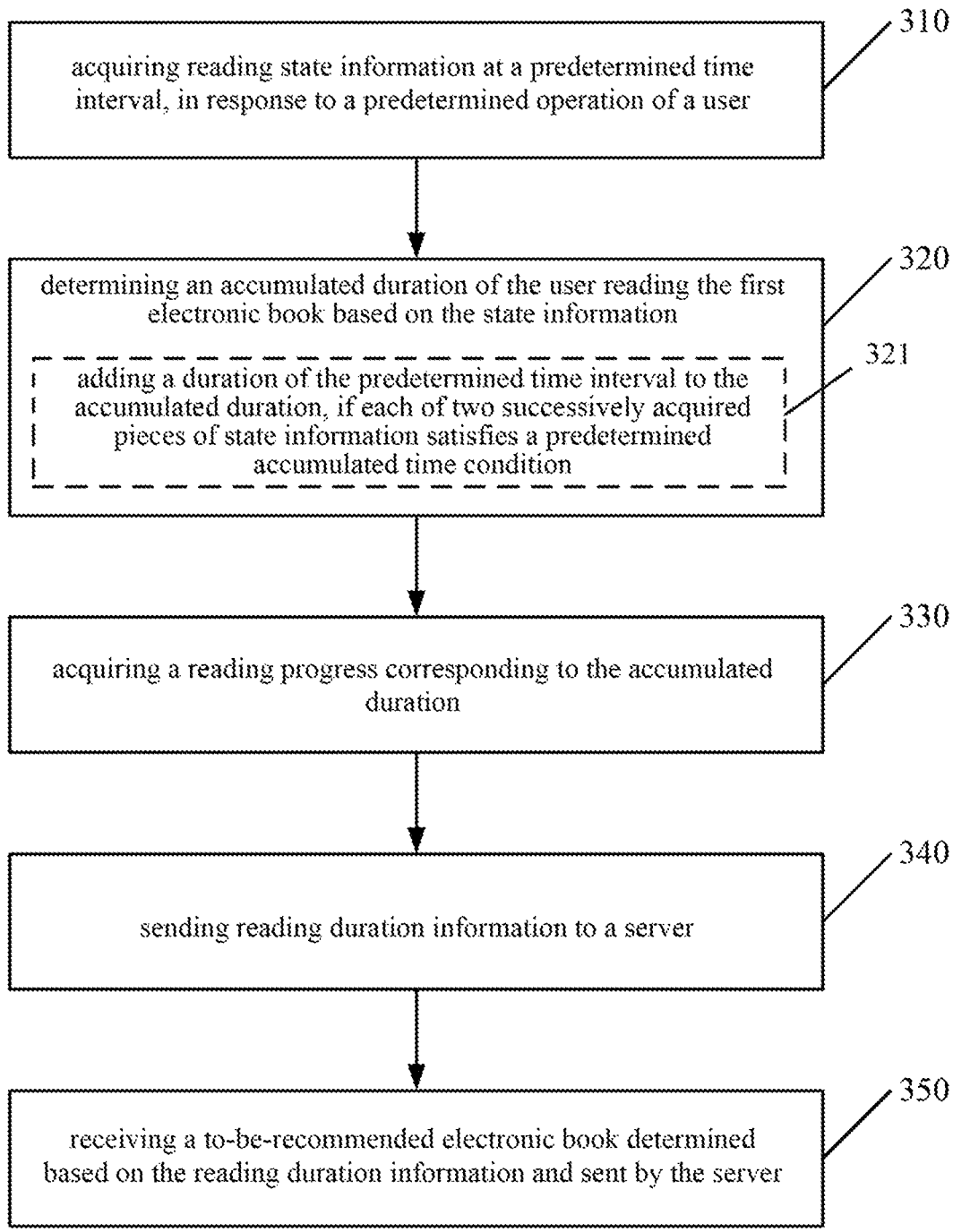
FIG. 3 is a schematic flowchart of another embodiment of the method for pushing an electronic book according to the present disclosure.

Referring to FIG. 3, a schematic flowchart 300 of a method for pushing an electronic book according to another embodiment of the present disclosure is shown.

The method for pushing an electronic book according to the present embodiment may be executed, for example, by the terminal device in FIG. 1.

The method for pushing an electronic book according to the present embodiment may include steps 310 to 350.

Step 310 includes acquiring reading state information at a predetermined time interval, in response to a predetermined operation of a user, the predetermined operation being an operation for instructing the user to start reading a first electronic book.

Here, the reading state information may be any information that may be used to represent whether the user is reading the first electronic book.

Step 320 includes determining, based on the state information, an accumulated duration that the user reads the first electronic book.

Here, the accumulated duration may be used to represent the length of time spent by the user in reading the same electronic book (the first electronic book).

In some alternative implementations, if each of two successively collected pieces of read state information indicates that the user is reading a certain electronic book, the time interval between the two collections may be accumulated to update the accumulated duration of the electronic book.

Step 330 includes acquiring a reading progress corresponding to the accumulated duration.

Here, the reading progress may be any quantitative expression that can be used to characterize the ratio of the completed portion of the electronic book to the entirety of the electronic book. For example, the ratio of the number of read words in the electronic book to the total number of words in the electronic book may be used as the reading progress of the electronic book, or the ratio of the number of read pages in the electronic book to the total number of pages in the electronic book may alternatively be used as the reading progress of the electronic book.

Step 340 includes sending reading duration information to a server, the reading duration information including the accumulated duration, the reading progress corresponding to the accumulated duration, and identification information of the first electronic book.

Step 350 includes receiving a to-be-recommended electronic book determined based on the reading duration information and sent by the server.

The current reading habits of the user of the terminal, i.e., the amount of reading per unit time and the length of time required for completing reading of a single electronic book represented by the reading duration information, are considered by the server in pushing the to-be-recommended electronic book. Thus, the to-be-recommended electronic book pushed by the server may better match the reading preference of the user, avoiding the waste of network traffic that may result from a "non-targeted" push.

In some alternative implementations, the determining an accumulated duration of the user reading the first electronic book based on the state information in step 320 may further include step 321.

Step 321 includes adding a duration of the predetermined time interval to the accumulated duration, if each of two successively acquired pieces of state information satisfies a predetermined accumulated time condition.

In some alternative implementations, the reading state information may include, for example, a screen luminance and an eye state of the user.

In some alternative implementations, the predetermined accumulated time condition may include: the screen luminance exceeding a predetermined luminance, and/or, a vision point being in a predetermined screen area.

In some application scenarios, after the terminal receives an instruction for starting the operation of reading the electronic book sent by the user, the terminal may collect screen luminance information of the terminal at a predetermined time interval. If each of two successively collected screen luminances is greater than a predetermined luminance, it is determined that the user is reading the electronic book within the period between the two successive collections. Therefore, the accumulated duration of the user reading the electronic book may be updated by adding this period of time to the accumulated duration.

In some other application scenarios, the terminal may collect the vision point of the user through a camera (e.g., a front camera) thereon. If the vision point is in a predetermined area (e.g., an area on the display screen presenting text of the electronic book) on the display screen, it may be determined that the user is reading the electronic book. If each of two successively collected vision points is located in the predetermined area, it may be determined that the user is reading the electronic book within this period of time. Therefore, the accumulated duration of the user reading the electronic book may be updated by adding this period of time on the accumulated duration.

In some other application scenarios, the terminal may determine whether the user is in the reading state based on the screen luminance and the vision point, and update the accumulated duration of the user reading the electronic book based on these parameters indicating the reading state.

The method according to the above embodiment of the present disclosure determines the electronic books pushed to the terminals by accurately determining the reading preferences of the users of different terminals and the average reading durations of different electronic books, achieving a targeted push of electronic books.

Figure 4:
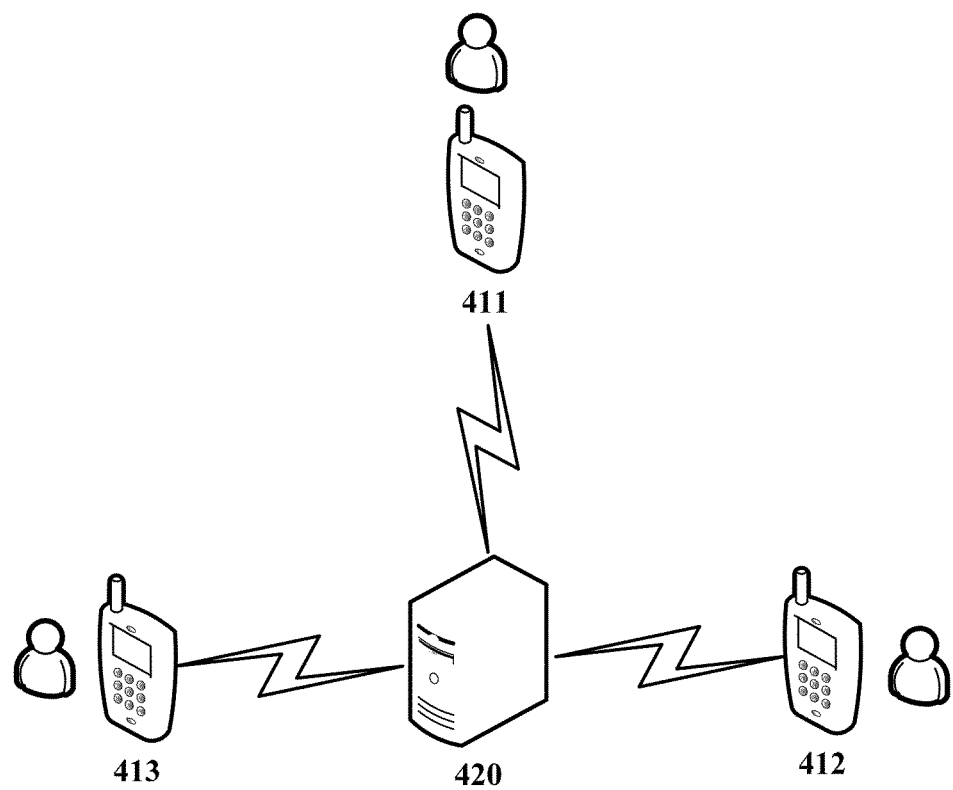
FIG. 4 is a schematic diagram of an application scenario of the method for pushing an electronic book according to the present disclosure.

The application scenario of the method for pushing an electronic book according to the present disclosure will be illustrated in further details with reference to FIG. 4, so that the technical solution of the present disclosure is clearer.

As shown in FIG. 4, the users of the terminals 411-413 all acquire electronic books from the server 420 through a reading APP (Application) installed on the terminals. It is assumed that the terminal 411 and the terminal 412 send requests to the server 420 to acquire the electronic book A, and the terminal 413 sends a request to the server 420 to acquire the electronic book B. After receiving these requests, the server 420 may send the electronic book A or a part thereof to the terminal 411 and the terminal 412, and send the electronic book B or a part thereof to the terminal 413.

After the server 420 sends the electronic books to the terminals 411-413, the terminals 411-413 may present an icon corresponding to the electronic book on the display screen for reading by the user. The user may start the reading state by clicking on the icon representing the electronic book.

After entering the reading state, the terminals 411-413 may collect the reading state information of the users at regular intervals to determine whether the users are reading the electronic books at the current moment. Based on the collected reading state information, the terminals may update the accumulated durations for the electronic books read by the users and the reading progresses corresponding to the accumulated durations, and send this information, the identification information of the electronic books and the identity information of the terminals 411-413 together to the server 420.

After the server 420 receives the information sent by the terminal 411-413, the reading preference information of the user of the terminal 411 and the reading duration of the electronic book A may be determined according to the reading duration information sent by the terminal 411. The server 420 may also determine the reading preference information of the user of the terminal 412 and the reading duration of the electronic book A according to the reading duration information sent by the terminal 412. Through the information sent by the terminal 411 and the terminal 412, the average reading duration of the electronic book A may be determined.

Similarly, the server 420 may also determine the reading preference information of the user of the terminal 413 and the reading duration of the electronic book B according to the reading duration information sent by the terminal 413.

After the server 420 acquires the above information, the average reading duration of the electronic books stored in a database of the server may be updated, and the database may also be searched for electronic books that match the reading preferences of the users and the matched books are pushed to the corresponding terminals.

In this way, the terminals 411-413 accurately collect the reading state of the user and the accumulated durations of reading the electronic books. The server 420 determines the reading preference of each terminal and the average reading duration of each electronic book based on the information sent by the terminals 411-413. Therefore, the electronic books pushed by the server 420 to the terminals have a higher degree of matching the reading preferences of the users of the terminals 411-413, and the push is more targeted.

Figure 5:
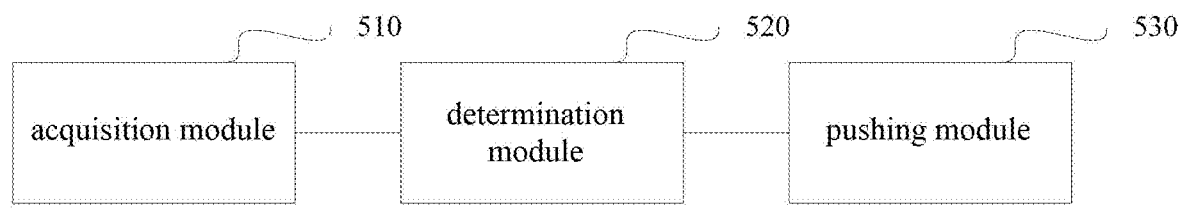
FIG. 5 is a schematic structural diagram of an embodiment of an apparatus for pushing an electronic book according to the present disclosure.

With further reference to FIG. 5, as an implementation to the method shown in the above figures, the present disclosure provides an apparatus for pushing an electronic book according to an embodiment. The apparatus embodiment corresponds to the method embodiment shown in FIG. 2, and the apparatus may specifically be applied to various electronic devices.

As shown in FIG. 5, the apparatus 500 for pushing an electronic book according to the present embodiment includes an acquisition module 510, a determination module 520 and a pushing module 530.

The acquisition module 510 may be configured to acquire reading duration information sent by a plurality of terminals, the reading duration information including identity information of the terminals, identification information of an electronic book read by a user of the terminals and reading time information corresponding to the identification information.

The determination module 520 may be configured to determine reading preference information of each terminal corresponding to the identity information and an average reading duration of each electronic book corresponding to the identification information based on the reading time information.

The pushing module 530 may be configured to push a first electronic book to a first terminal based on the reading preference information and the average reading duration, an average reading duration of the first electronic book matching reading preference information of the first terminal.

In some alternative implementations, the reading time information includes a reading progress and an accumulated duration corresponding to the reading progress, the reading progress including a ratio of a number of read words in the electronic book to a total number of words in the electronic book.

In these alternative implementations, when determining reading preference information of each terminal corresponding to the identity information based on the reading time information, the determination module 520 may be further configured to: determine a reading completion duration of each electronic book corresponding to the identification information, based on the reading progress and the accumulated duration corresponding to the reading progress; and determine the reading preference information of each terminal. The reading preference information includes an average reading completion duration determined based on the reading completion duration of the terminal regarding each electronic book corresponding to the identification information.

In some alternative implementations, when determining the average reading duration of each electronic book corresponding to the identification information based on the reading time information, the determination module 520 may be further configured to: determine a number of occurrence of each reading completion duration, based on a reading completion duration of regrading regarding same identification information; and determine the average reading duration of the electronic book based on the reading completion duration and the number of occurrence of each reading completion duration.

In some alternative implementations, when determining the average reading duration of the electronic book based on the reading completion duration and the number of occurrence of each reading completion duration, the determination module 520 may determine the average reading duration according to the following formula:

$$T = \frac{\sum_{i=1}^{n} T_i X_i}{\sum_{i=1}^{n} X_i}.$$

Here, T is the average reading duration, $X_i$ is the number of occurrence of the $i^{th}$ reading completion duration $T_i$, and satisfies:

$$\sum_{i=1}^{n} T_i X_i = \sum_{j=1}^{m} T_j;$$

and m is the number of terminals reading the electronic book corresponding to the identification information, and $T_j$ is a reading completion duration of the $j^{th}$ terminal.

In some alternative implementations, the pushing module 530 may be further configured to: push the first electronic book to the first terminal, based on a difference between the average reading duration of the first electronic book and an average reading completion duration in the reading preference information of the first terminal being smaller than a predetermined time threshold.

Those skilled in the art may understand that the above-mentioned apparatus 500 for pushing an electronic book may also include some other well-known structures, such as a processor and a memory. These well-known structures are not shown in FIG. 5 in order not to obscure the embodiments of the present disclosure unnecessarily.

Figure 6:
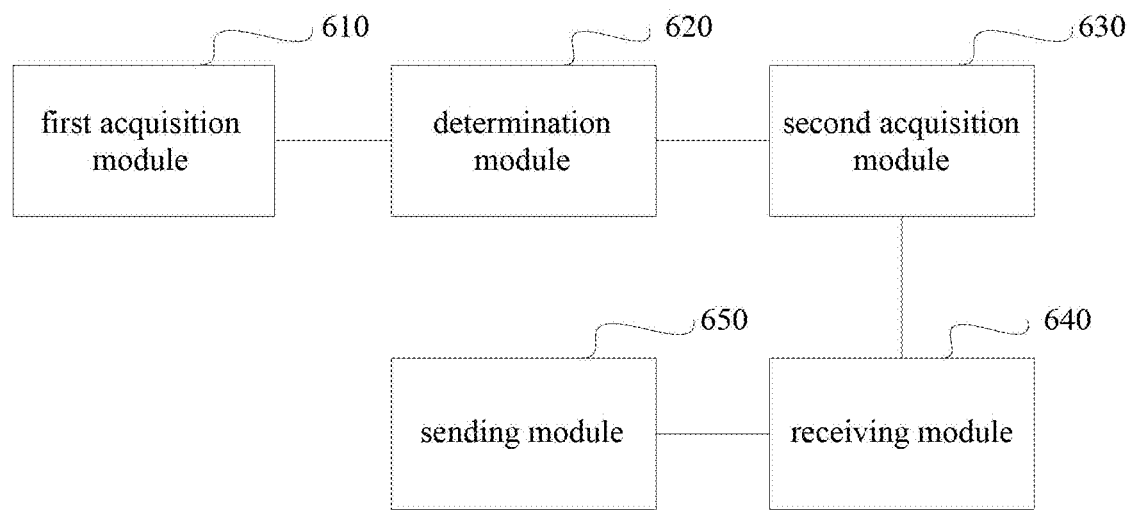
FIG. 6 is a schematic structural diagram of another embodiment of the apparatus for pushing an electronic book according to the present disclosure.

With further reference to FIG. 6, as an implementation to the method shown in the above figures, the present disclosure provides an apparatus for pushing an electronic book according to an embodiment. The apparatus embodiment corresponds to the method embodiment shown in FIG. 3, and the apparatus may specifically be applied to various electronic devices.

The apparatus for pushing an electronic book of the present embodiment includes: a first acquisition module 610, a determination module 620, a second acquisition module 630, a sending module 640 and a receiving module 650.

The first acquisition module 610 may be configured to acquire reading state information at a predetermined time interval, in response to a predetermined operation of a user, the predetermined operation being an operation for instructing the user to start reading a first electronic book.

The determination module 620 may be configured to determine an accumulated duration of the user reading the first electronic book based on the state information.

The second acquisition module 630 may be configured to acquire a reading progress corresponding to the accumulated duration.

The sending module 640 may be configured to send reading duration information to a server, the reading duration information including the accumulated duration, the reading progress corresponding to the accumulated duration, and identification information of the first electronic book.

The receiving module 650 may be configured to receive a to-be-recommended electronic book determined based on the reading duration information and sent by the server.

In some alternative implementations, the determination module 620 may be further configured to: adding a duration of the predetermined time interval to the accumulated duration, if each of two successively acquired pieces of state information satisfies a predetermined accumulated time condition.

In some alternative implementations, the reading state information may include a screen luminance and an eye state of the user. The predetermined accumulated time condition includes at least one of: the screen luminance exceeding a predetermined brightness, and a vision point being in a predetermined screen area.

Those skilled in the art may understand that the above-mentioned apparatus 600 for pushing an electronic book may also include some other well-known structures, such as a processor and a memory. These well-known structures are not shown in FIG. 6 in order not to obscure the embodiments of the present disclosure unnecessarily.

Figure 7:
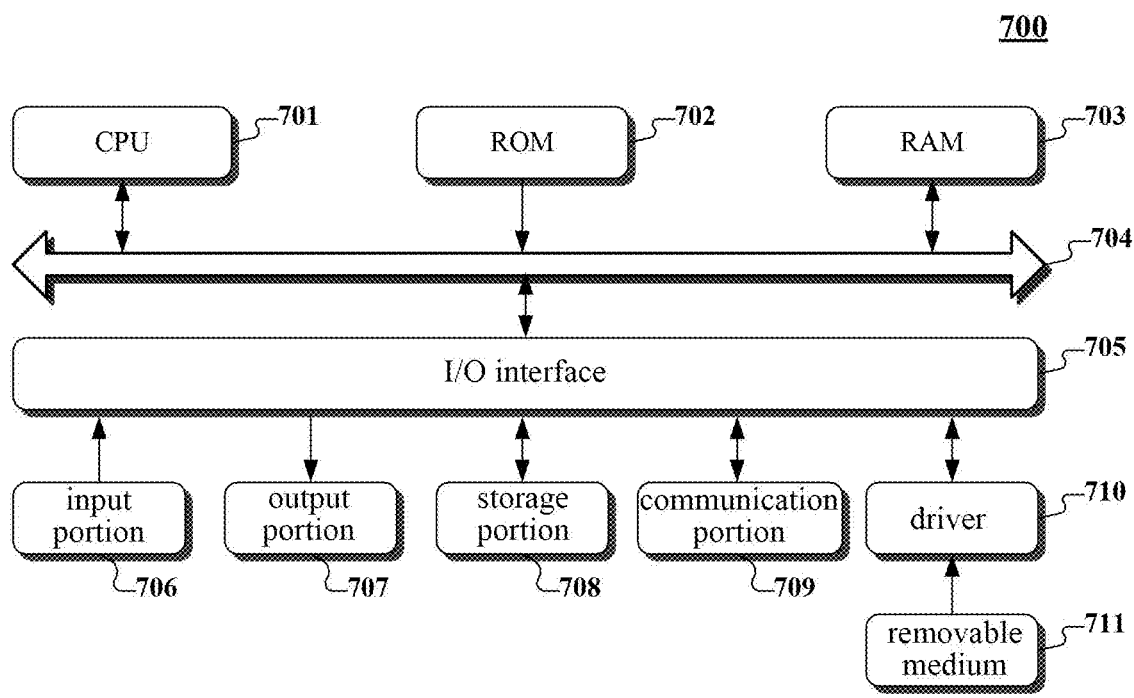
FIG. 7 is a schematic structural diagram of a computer system adapted to implement a terminal device or a server of embodiments of the present disclosure.

Referring to FIG. 7, a schematic structural diagram of a computer system 700 adapted to implement a terminal device or a server of the embodiments of the present disclosure is shown.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 including a cathode ray tube (CRT), a liquid crystal display device (LCD), a speaker etc.; a storage portion 708 including a hard disk and the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to an embodiment of the present disclosure, the process described above with reference to the flowchart may be implemented in a computer software program. For example, an embodiment of the present disclosure includes a computer program product, which includes a computer program that is tangibly embedded in a machine-readable medium. The computer program includes program codes for executing the method as illustrated in the flowchart. In such an embodiment, the computer program may be downloaded and installed from a network via the communication portion 709, and/or may be installed from the removable medium 711.

The flowcharts and block diagrams in the accompanying drawings illustrate architectures, functions and operations that may be implemented according to the system, the method and the computer program product of the various embodiments of the present disclosure. In this regard, each block in the flowcharts and block diagrams may represent a module, a program segment, or a code portion. The module, the program segment, or the code portion includes one or more executable instructions for implementing the specified logical function. It should also be noted that, in some alternative implementations, the functions denoted by the blocks may occur in a sequence different from the sequences shown in the accompanying drawings. For example, in practice, two blocks in succession may be executed, depending on the involved functionalities, substantially in parallel, or in a reverse sequence. It should also be noted that, each block in the block diagrams and/or the flowcharts and a combination of the blocks in the block diagrams and/or the flowcharts may be implemented by a dedicated hardware-based system executing specific functions or operations, or by a combination of a dedicated hardware and computer instructions.

The units involved in the embodiments of the present disclosure may be implemented by way of software or hardware. The described units may also be provided in a processor, for example, described as: a processor, including an acquisition unit, a determination unit, and a pushing unit, where the names of these units are not considered as a limitation to the units under certain circumstances. For example, the acquisition unit may also be described as "a module acquiring reading duration information sent by a plurality of terminals."

In another aspect, the present disclosure further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquire reading duration information sent by a plurality of terminals, the reading duration information including identity information of the terminals, identification information of an electronic book read by users of the terminals and reading time information corresponding to the identification information; determine reading preference information of the terminals corresponding to the identity information and an average reading duration of each electronic book corresponding to the identification information based on the reading time information; and push a first electronic book to a terminal based on the reading preference information and the average reading duration, an average reading duration of the first electronic book matching reading preference information of the pushed terminal.

Or, the programs stored on the non-volatile computer programs, when executed by a device, may also cause the device to: acquire reading state information at a predetermined time interval, in response to a predetermined operation of a user, the predetermined operation being an operation for instructing the user to start reading a first electronic book; determine an accumulated duration of the user reading the first electronic book based on the state information; acquire a reading progress corresponding to the accumulated duration; send reading duration information to a server, the reading duration information including the accumulated duration, the reading progress corresponding to the accumulated duration, and identification information of the first electronic book; and receive a to-be-recommended electronic book determined based on the reading duration information sent by the server.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for pushing an electronic book, the method comprising:

acquiring reading duration information sent by a plurality of terminals, the reading duration information comprising identity information of the terminals, identification information of an electronic book read by a user of the terminals and reading time information corresponding to the identification information;

determining reading preference information of each terminal corresponding to the identity information and an average reading duration of each electronic book corresponding to the identification information based on the reading time information; and pushing a first electronic book to a first terminal based on the reading preference information and the average reading duration, an average reading duration of the first electronic book matching reading preference information of the first terminal;

wherein determining the average reading duration of each electronic book corresponding to the identification information based on the reading time information comprises:

determining a number of occurrence of reading completion durations of the terminals regarding same identification information, the number of occurrence of the reading completion durations referring to a number of repetition of the time values of the reading completion durations of the terminals regarding the same identification information; and determining the average reading duration of each electronic book based on the reading completion durations of the terminals regarding the same identification information and a weight of the number of occurrence of each reading completion duration.

2. The method according to claim 1, wherein, the reading time information comprises a reading progress and an accumulated duration corresponding to the reading progress, the reading progress comprising a ratio of a number of read words in the electronic book to a total number of words in the electronic book; and the determining reading preference information of each terminal corresponding to the identity information based on the reading time information comprises:

determining a reading completion duration of each electronic book corresponding to the identification information, based on the reading progress and the accumulated duration corresponding to the reading progress, and determining the reading preference information of each terminal, wherein, the reading preference information comprises an average reading completion duration determined based on a reading completion duration of the each terminal regarding each electronic book corresponding to the identification information; and the pushing a first electronic book to a first terminal based on the reading preference information and the average reading duration comprises:

pushing the first electronic book to the first terminal, based on a difference between the average reading duration of the first electronic book and an average reading completion duration in the reading preference information of the first terminal being less than a predetermined time threshold.

3. The method according to claim 1, wherein the determining the average reading duration of each electronic book based on the reading completion duration of the each terminal regarding same identification information and the number of occurrence of the reading completion duration comprises determining the average reading duration according to a following formula:

$$T = \frac{\sum_{i=1}^{n} T_i X_i}{\sum_{i=1}^{n} X_i};$$

wherein T is the average reading duration, $X_i$ is a number of occurrence of an $i^{th}$ reading completion duration $T_i$, and satisfies:

$$\sum_{i=1}^{n} T_i X_i = \sum_{j=1}^{m} T_j; \text{ and}$$

wherein m is a number of terminals reading the electronic book corresponding to the identification information, and $T_j$ is a reading completion duration of a $j^{th}$ terminal.

4. The method according to claim 1, wherein, the reading time information comprises an accumulated duration of reading the electronic book, the accumulated duration being determined based on reading state information.

5. The method according to claim 4, wherein determining the accumulated duration of reading the first electronic book based on the state information comprises:

adding a duration of the predetermined time interval to the accumulated duration, if each of two successively acquired pieces of the state information satisfies a predetermined accumulated time condition.

6. The method according to claim 5, wherein the reading state information comprises at least one of a screen luminance or an eye state of the user; and the predetermined accumulated time condition comprises at least one of:

the screen luminance exceeding a predetermined luminance; or a vision point being in a predetermined screen area.

7. An apparatus for pushing an electronic book, the apparatus comprising:

at least one processor; and a memory storing instructions, the instructions when executed by the at least one processor, cause the at least one processor to perform operations, the operations comprising:

acquiring reading duration information sent by a plurality of terminals, the reading duration information comprising identity information of the terminals, identification information of an electronic book read by a user of the terminals and reading time information corresponding to the identification information;

determining reading preference information of each terminal corresponding to the identity information and an average reading duration of each electronic book corresponding to the identification information based on the reading time information; and pushing a first electronic book to a first terminal based on the reading preference information and the average reading duration, an average reading duration of the first electronic book matching reading preference information of the first terminal;

wherein determining the average reading duration of each electronic book corresponding to the identification information based on the reading time information comprises:

determining a number of occurrence of reading completion durations of the terminals regarding same identification information, the number of occurrence of the reading completion durations referring to a number of repetition of the time values of the reading completion durations of the terminals regarding the same identification information; and determining the average reading duration of each electronic book based on the reading completion durations of the terminals regarding the same identification information and a weight of the number of occurrence of each reading completion duration.

8. The apparatus according to claim 7, wherein,
the reading time information comprises a reading progress and an accumulated duration corresponding to the reading progress, the reading progress comprising a ratio of a number of read words in the electronic book to a total number of words in the electronic book;
the determining reading preference information of each terminal corresponding to the identity information based on the reading time information comprises:
determining a reading completion duration of each electronic book corresponding to the identification information, based on the reading progress and the accumulated duration corresponding to the reading progress, and
determining the reading preference information of the terminals,
wherein, the reading preference information comprises an average reading completion duration determined based on a reading completion duration of the each terminal regarding each electronic book corresponding to the identification information; and
the pushing a first electronic book to a first terminal based on the reading preference information and the average reading duration comprises:
pushing the first electronic book to the first terminal, based on a difference between the average reading duration of the first electronic book and an average reading completion duration in the reading preference information of the first terminal being less than a predetermined time threshold.

9. The apparatus according to claim 7, wherein, the determining the average reading duration of each electronic book based on the reading completion duration of the each terminal regarding same identification information and the number of occurrence of the reading completion duration comprises determining the average reading duration according to a following formula:

$$T = \frac{\sum_{i=1}^{n} T_i X_i}{\sum_{i=1}^{n} X_i};$$

wherein T is the average reading duration, $X_i$ is a number of occurrence of an $i^{th}$ reading completion duration $T_i$, and satisfies:

$$\sum_{i=1}^{n} T_i X_i = \sum_{j=1}^{m} T_j;$$

and
wherein m is a number of terminals reading the electronic book corresponding to the identification, and $T_j$ is a reading completion duration of a $j^{th}$ terminal.

10. The apparatus according to claim 7, wherein, the reading time information comprises an accumulated duration of reading the electronic book, the accumulated duration being determined based on reading state information.

11. The apparatus according to claim 10, wherein determining the accumulated duration of reading the first electronic book based on the state information comprises:
adding a duration of the predetermined time interval to the accumulated duration, if each of two successively acquired pieces of the state information satisfies a predetermined accumulated time condition.

12. The apparatus according to claim 11, wherein the reading state information comprises at least one of a screen luminance or an eye state of the user; and
the predetermined accumulated time condition comprises at least one of:
the screen luminance exceeding a predetermined luminance; or
a vision point being in a predetermined screen area.

13. A non-transitory computer storage medium, storing computer-readable instructions executable by a processor, the computer-readable instructions, when executed by the processor, cause the processor to perform operations, the operations comprising:
acquiring reading duration information sent by a plurality of terminals, the reading duration information comprising identity information of the terminals, identification information of an electronic book read by a user of the terminals and reading time information corresponding to the identification information;
determining reading preference information of each terminal corresponding to the identity information and an average reading duration of each electronic book corresponding to the identification information based on the reading time information; and
pushing a first electronic book to a first terminal based on the reading preference information and the average reading duration, an average reading duration of the first electronic book matching reading preference information of the first terminal;
wherein determining the average reading duration of each electronic book corresponding to the identification information based on the reading time information comprises:
determining a number of occurrence of reading completion durations of the terminals regarding same identification information, the number of occurrence of the reading completion durations referring to a number of repetition of the time values of the reading completion durations of the terminals regarding the same identification information; and
determining the average reading duration of each electronic book based on the reading completion durations of the terminals regarding the same identification information and a weight of the number of occurrence of each reading completion duration.

14. The non-transitory computer storage medium according to claim 13, wherein the reading time information comprises a reading progress and an accumulated duration corresponding to the reading progress, the reading progress comprising a ratio of a number of read words in the electronic book to a total number of words in the electronic book; and
the determining reading preference information of each terminal corresponding to the identity information based on the reading time information comprises:
determining a reading completion duration of each electronic book corresponding to the identification information, based on the reading progress and the accumulated duration corresponding to the reading progress, and
determining the reading preference information of each terminal,
wherein, the reading preference information comprises an average reading completion duration determined based on a reading completion duration of the each terminal regarding each electronic book corresponding to the identification information; and the pushing a first electronic book to a first terminal based on the reading preference information and the average reading duration comprises:

pushing the first electronic book to the first terminal, based on a difference between the average reading duration of the first electronic book and an average reading completion duration in the reading preference information of the first terminal being less than a predetermined time threshold.

15. The non-transitory computer storage medium according to claim 13, wherein the determining the average reading duration of each electronic book based on the reading completion duration of the each terminal regarding same identification information and the number of occurrence of the reading completion duration comprises determining the average reading duration according to a following formula:

$$T = \frac{\sum_{i=1}^{n} T_i X_i}{\sum_{i=1}^{n} X_i};$$

wherein T is the average reading duration, $X_i$ is a number of occurrence of an $i^{th}$ reading completion duration $T_i$, and satisfies:

$$\sum_{i=1}^{n} T_i X_i = \sum_{j=1}^{m} T_j;$$

and wherein m is a number of terminals reading the electronic book corresponding to the identification information, and $T_j$ is a reading completion duration of a $j^{th}$ terminal.

* * * * *